United States Patent
Kubota

[11] 3,907,561
[45] Sept. 23, 1975

[54] PYRONYL-PYRYLIUM SENSITIZERS FOR ELECTROPHOTOGRAPHIC ORGANIC PHOTOCONDUCTORS

[75] Inventor: Tomio Kubota, Tokyo, Japan

[73] Assignee: Kabushiki Kaisha Ricoh, Tokyo, Japan

[22] Filed: Oct. 4, 1973

[21] Appl. No.: 403,402

[30] Foreign Application Priority Data
Oct. 6, 1972  Japan............................. 47-100799
Oct. 6, 1972  Japan............................. 47-100800
Oct. 6, 1972  Japan............................. 47-100801

[52] U.S. Cl................................. 96/1.6; 260/343.2
[51] Int. Cl.² ........................................ G03G 5/06
[58] Field of Search ............ 96/1.6, 139; 260/343.2

[56] References Cited
UNITED STATES PATENTS
2,378,583  6/1945  Schmidt et al. .......... 260/343.2 R X
3,526,502  1/1970  Murakami et al. ................. 96/1.6 X
3,712,811  1/1973  Murakami et al. .................... 96/1.6

Primary Examiner—Roland E. Martin, Jr.
Attorney, Agent, or Firm—Cooper, Dunham, Clark, Griffin & Moran

[57] ABSTRACT

Novel sensitizers for use in electrophotographic organic photoconductors, which are compounds having the following general formula:

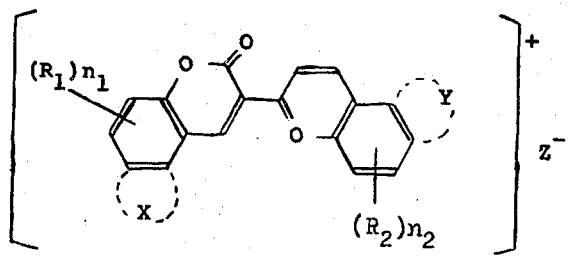

(wherein each of $R_1$ and $R_2$ represents a radical selected from the group consisting of hydrogen, alkyl having 1 – 2 carbon atoms, alkoxy having 1 – 2 carbon atoms, halogen and nitro, each of $n_1$ and $n_2$ represents an integer from 1 to 2 in the case where said $R_1$ and $R_2$ represent a radical other than hydrogen, each X and Y when present, represent a fused phenyl nucleus having at most two substituents selected from the group defined for said $R_1$ and $R_2$ and $Z^-$ represents an anionic functional group).

26 Claims, 19 Drawing Figures

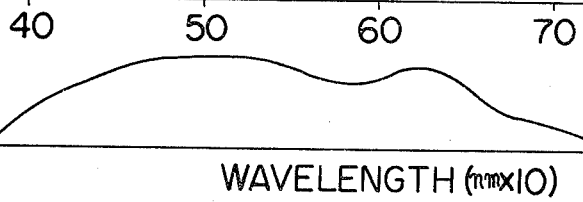
FIG. 1 (SENSITIZER NO. 1)
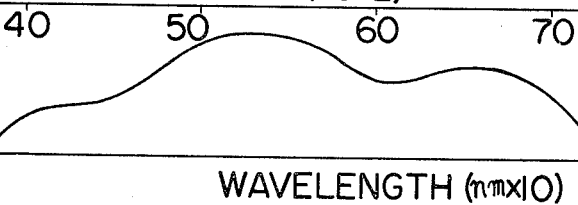
FIG. 2 (SENSITIZER NO. 2)
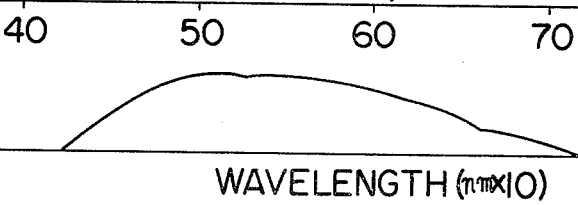
FIG. 3 (SENSITIZER NO. 3)
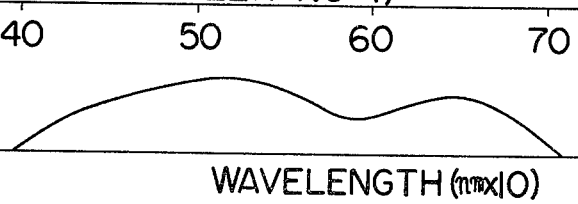
FIG. 4 (SENSITIZER NO. 4)
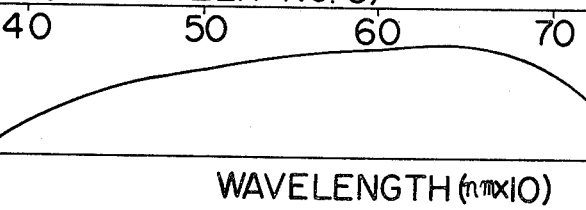
FIG. 5 (SENSITIZER NO. 5)

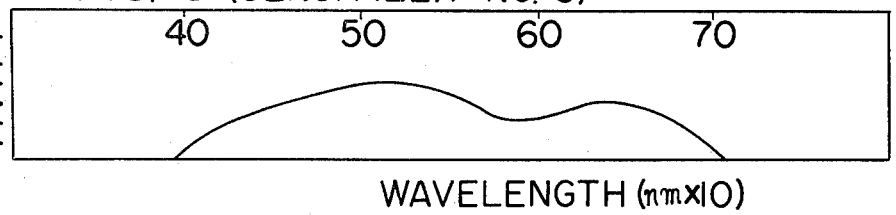
FIG. 6 (SENSITIZER NO. 6)
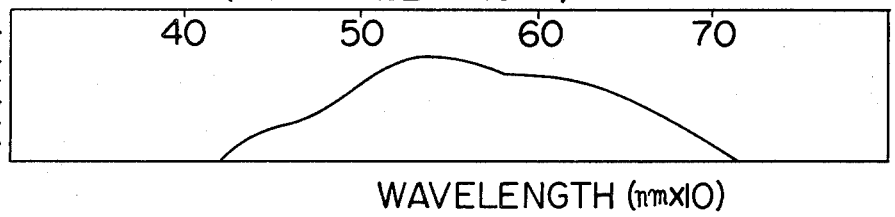
FIG. 7 (SENSITIZER NO. 7)
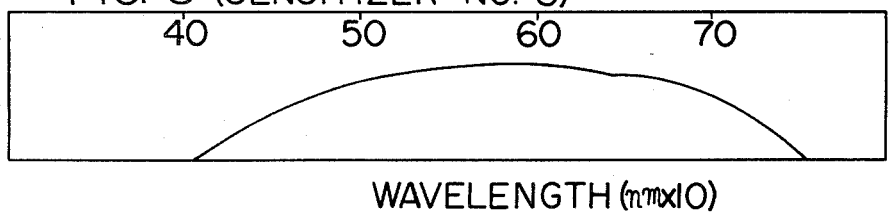
FIG. 8 (SENSITIZER NO. 8)
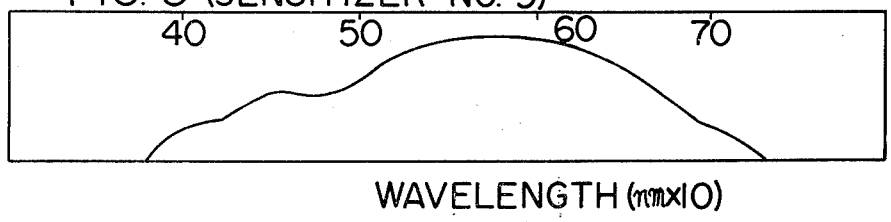
FIG. 9 (SENSITIZER NO. 9)

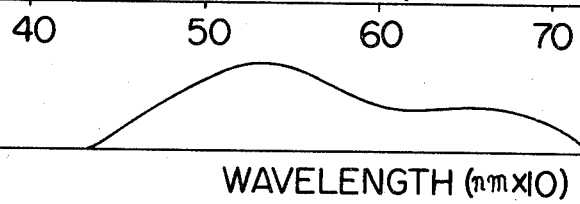
FIG. 10 (SENSITIZER NO. 10)
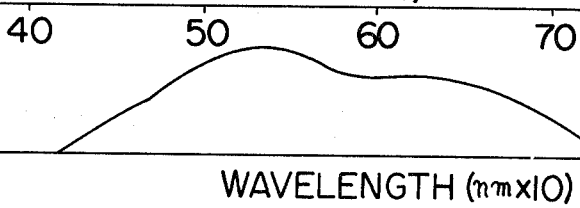
FIG. 11 (SENSITIZER NO. 11)
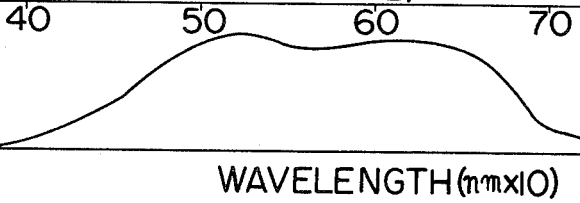
FIG. 12 (SENSITIZER NO. 12)
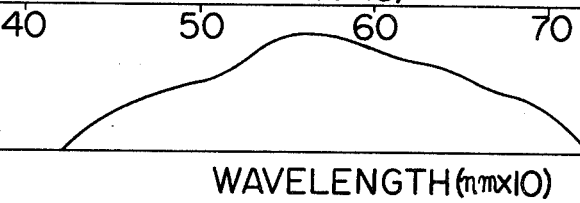
FIG. 13 (SENSITIZER NO. 13)
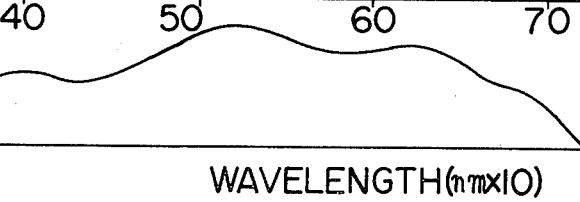
FIG. 14 (SENSITIZER NO. 14)

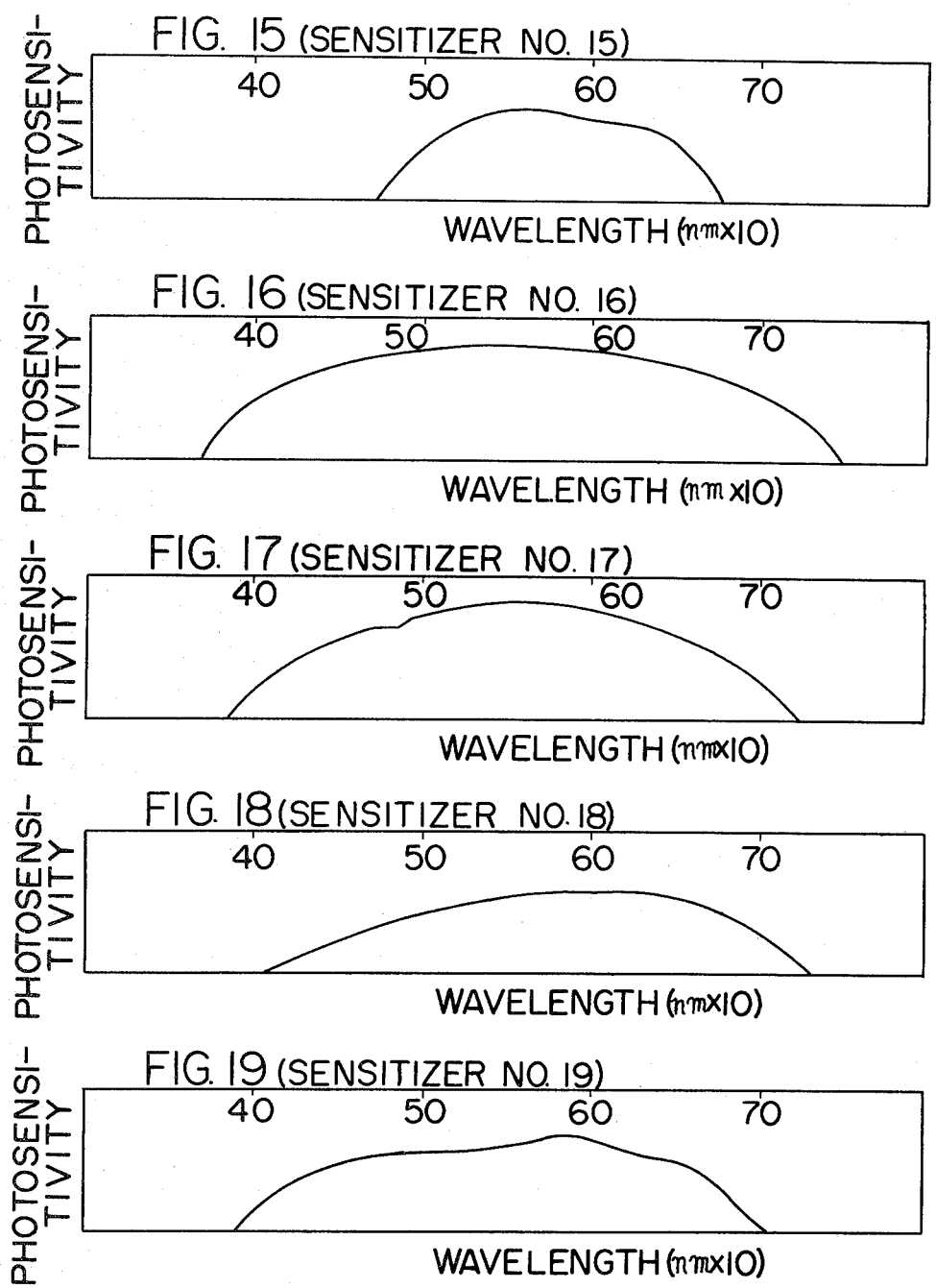

PYRONYL-PYRYLIUM SENSITIZERS FOR ELECTROPHOTOGRAPHIC ORGANIC PHOTOCONDUCTORS

BACKGROUND OF THE INVENTION a. Field of the Invention

The present invention relates to sensitizers for use in electrophotographic organic photoconductors, which act to increase the chemical sensitivity and the optical or spectral sensitivity of organic photoconductors for use in electrophotography.

b. Description of the Prior Art

The sensitizers of the present invention are novel compounds. Application of such compounds to electrophotography is therefore unprecedented.

SUMMARY OF THE INVENTION

The object of the present invention is to provide novel sensitizers for use in electrophotographic organic photoconductors, said sensitizers are compounds expressed by the following general formula:

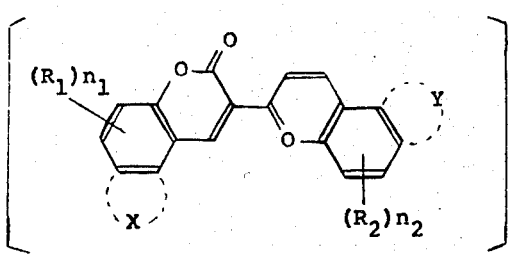

(wherein each of $R_1$ and $R_2$ represents a radical selected from the group consisting of hydrogen, alkyl having 1 – 2 carbon atoms, alkoxy having 1 – 2 carbon atoms, halogen and nitro, each of $n_1$ and $n_2$ represents an integer from 1 to 2 in the case where said $R_1$ and $R_2$ represent one radical other than hydrogen, each of X and Y when present, represent a fused phenyl nucleus having at most two substituents selected from the group defined for said $R_1$ and $R_2$ and $Z^-$ represents anionic functional group).

Compounds within the scope of this general formula can be divided into compounds having the general formulas (I), (II), (III) and (IV) as follows:

Compounds of the the general formula (II)

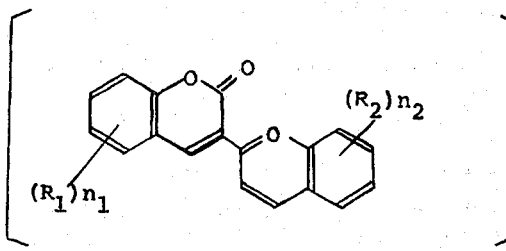

wherein each of $R_1$ and $R_2$ represents hydrogen, an alkyl group having 1 or 2 carbon atoms, an alkoxy group having 1 or 2 carbon atoms, halogen or nitro group; each of $n_1$ and $n_2$ represents an integer from 1 to 2 in the case where said $R_1$ and $R_2$ represent a radical other than hydrogen.

Compounds of the general formula (II)

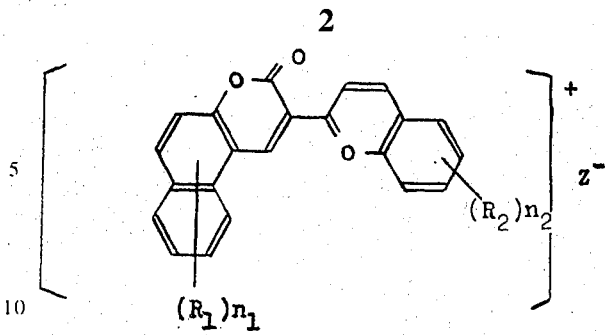

wherein $R_1$, $R_2$, $Z^-$, $n_1$ and $n_2$ are respectively the same as defined in the general formula (I).

Compounds of the general formula (III)

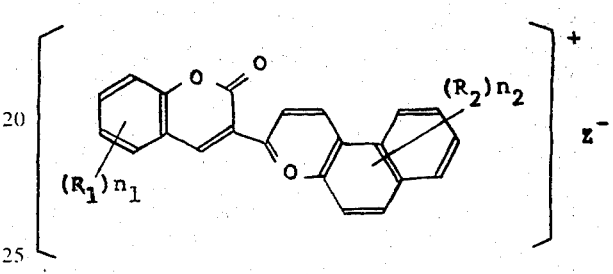

wherein $R_1$, $R_2$, $Z^-$, $n_1$ and $n_2$ are respectively the same as defined in the general formula (I).

Compounds of the general formula (IV)

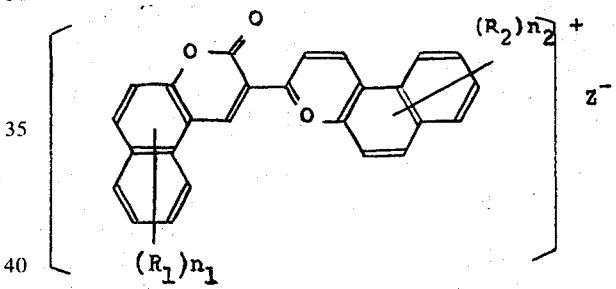

wherein $R_1$, $R_2$, $Z^-$, $n_1$ and $n_2$ are respectively the same as defined in the general formula (I).

All the compounds expressed by the foregoing general formulas (I) to (IV) are yellow or pink crystalline dyestuffs showing the maximum absorption wavelength ($\lambda$ max) of 450 – 660 nm. They are readily synthesized by reacting an acetyl coumarin derivative derived from substituted 2-hydroxybenzaldehyde with substituted 2-hydroxybenzaldehyde in the presence of a mineral acid.

The following are typical examples of the synthesis of the compounds of general formula (I).

a. Synthesis of sensitizer No. 1: 2-[3-(1,2)-benzopyronyl]-benzopyrylium perchlorate (wherein $R_1$ and $R_2$: hydrogen, $Z^-$: $ClO_4^-$, $n_1$ and $n_2$: 1)

After dissolving 4.2 g of 3-acetyl coumarin and 3 g of 2-hydroxybenzaldehyde in 90 ml of dehydrated ethyl ether and adding 12 ml of 70% perchloric acid, hydrochloric acid gas was introduced into the mixture to saturate it at a temperature of 0° – 30°C. After leaving the thus reacted solution standing overnight in an icebox and then subjecting it to suction filtration, the resulting crude crystals were thoroughly washed in water and rinsed with ethyl ether. Subsequently, the thus treated crude crystals were recrystallized from 200 – 300 ml of nitrobenzene, whereby 6 g of the objective compound in the form of crystal having a melting point of 286.1°C. were obtained. This compound was brown in color. Its nitromethane solution showed a maximum absorption wave-length of 450 nm and the extinction coefficient ($\epsilon/10^4$) of its molecule was 1.17.

b. Synthesis of sensitizer No. 2: 6-methoxy-2-[6-methoxy-3-(1,2)-benzopyronyl]-benzopyrylium perchlorate (wherein $R_1$ and $R_2$: methoxy group, $Z^-$: $ClO_4^-$, $n_1$ and $n_2$: 1)

By dissolving 4.6 g of 3-acetyl-6-methoxy coumarin and 3 g of 2-hydroxy-5-methoxybenzaldehyde in 150 ml of dichloroethane and applying the same procedure as that for the synthesis of sensitizer No. 1, 9 g of the objective compound in the form of crystals having a melting point of 262°C. were obtained. This compound is brown in color. Its nitromethane solution showed a maximum absorption wave-length of 505 nm and the extinction coefficient ($\epsilon/10^4$) of its molecule was 1.21.

c. Synthesis of sensitizer No. 3: 6-chloro-2-[6-chloro-3-(1,2)-benzopyronyl]-benzopyrylium perchlorate (wherein $R_1$ and $R_2$: chloro group, $Z^-$: $ClO_4^-$, $n_1$ and $n_2$: 1)

By dissolving 4.6 g of 3-acetyl-6-chlorocoumarin and 3 g of 2-hydroxy-5-chlorobenzaldehyde in 200 ml of dichloroethane and applying the same procedure as for the synthesis of the sensitizer No. 1, 3 g of the objective compound in the form of crystals having a melting point of 272 – 274°C were obtained. This compound was brown in color. Its nitromethane solution showed a maximum absorption wave-length of 460 nm and the extinction coefficient ($\epsilon/10^4$) of its molecule was 0.38.

d. Synthesis of sensitizer No. 4: 6-nitro-2-[6-nitro-3-(1,2)-benzopyronyl]-benzopyrylium perchlorate (wherein $R_1$ and $R_2$: nitro group, $Z^-$: $ClO_4^-$, $n_1$ and $n_2$: 1)

By dissolving 4.7 g of 3-acetyl-6-nitrocoumarin and 3.3 g of 2-hydroxy-5-nitrobenzaldehyde in 200 ml of dichloroethane and applying the same procedure as for the synthesis of the sensitizer No. 1, 2.5 g of the objective compound in the form of crystals having a melting point of 270° – 272°C were obtained. This compound was brown in color. Its nitromethane solution showed a maximum absorption wavelength of 592 nm and the extinction coefficient ($\epsilon/10^4$) of its molecule was 1.06.

e. Synthesis of sensitizer No. 5: 6-bromo-2-[6-bromo-3-(1,2)-benzopyronyl]-benzopyrylium perchlorate (wherein $R_1$ and $R_2$: bromo group, $Z^-$, $ClO_4^-$, $n_1$ and $n_2$: 1)

By dissolving 4.5 g of 3-acetyl-6-bromocoumarin and 3.2 g of 2-hydroxy-5-bromobenzaldehyde in 200 ml of dichloroethane and applying the same procedure as for the synthesis of the sensitizer No. 1, the objective compound in the form of crystals having a melting point of 266° – 268°C was obtained. This compound was brown in color. Its nitromethane solution showed a maxima absorption wave-length at 606 nm and 657 nm and the extinction coefficient ($\epsilon/10^4$) of its molecule was 0.09 and 0.10. The following are typical examples of the synthesis of the compounds of general formula (II).

a. Synthesis of sensitizer No. 6:2-[3-(1,2,$\beta\beta$,$\alpha$-naphthopyronyl)]-benzopyrylium perchlorate (wherein $R_1$: hydrogen, $R_2$: hydrogen, $Z$: $ClO_4^-$, $n_1$: 1, $n_2$: 1)

After dissolving 4.8 g of 3-acetyl naphthocoumarin and 3.0 g of 2-hydroxybenzaldehyde in 200 ml of dichloroethane and adding 12 ml of 70% perchloric acid hydrochloric acid gas was introduced into the mixture to saturate it at a temperature of 0° – 30°C. After leaving the thus reacted solution standing overnight in an icebox and then subjecting it to suction filtration, the resulting crude crystals were thoroughly washed in water and rinsed with ethyl ether. Subsequently, the thus treated crude crystals were recrystallized from 200 – 300 ml of nitrobenzene, whereby the objective compound in the form of crystals having a melting point of 241° – 243°C were obtained. This compound was orange-colored. Its nitromethane solution showed a maximum absorption wave-length of 500 nm and the extinction coefficient ($\epsilon/10^4$) of its molecule was 1.23.

b. Synthesis of sensitizer No. 7: 2-[3-{1,2,$\beta$,$\alpha$-(7-nitronaphthopyronyl)}]-6-methoxybenzopyrylium perchlorate (wherein $R_1$: nitro group, $R_2$: methoxy group, $Z^-$: $ClO_4^-$, $n_1$: 1, $n_2$: 1)

By dissolving 5.0 g of 3-acetyl-7-nitrocoumarin and 3.5 g of 2-hydroxy-6-methoxybenzaldehyde in 200 ml of dichloroethane and applying the same procedure as for the synthesis of the sensitizer No. 6 3.2 g of the objective compound in the form of crystals having a melting point of 168° – 170°C were obtained. This compound was ocher-colored. Its nitromethane solution showed a maximum absorption wavelength of 532 nm and the extinction coefficient ($\epsilon/10^4$) of its molecule was 1.49.

c. Synthesis of sensitizer No. 8: 2-[3-{1,2,$\beta$,$\alpha$-(7-chloronaphthopyronyl)}]-6-chlorobenzopyrylium perchlorate (wherein $R_1$: chloro group, $R_2$: chloro group, $Z^-$, $ClO_4^-$, $n_1$: 1, $n_2$: 1)

By dissolving 5.0 g of 3-acetyl-7-chloronaphthocoumarin and 3.5 g of 2-hydroxy-6-chlorobenzaldehyde in 200 ml of dichloroethane and applying the same procedure as for the synthesis of the sensitizer No. 6 2.3 g of the objective compound in the form of crystals having the melting point of 290° – 292°C were obtained. This compound was brown in color. Its nitromethane solution showed maxima absorption wavelengths at 601 nm and 649 nm and the extinction coefficient ($\epsilon/10^4$) of its molecule was 1.14 and 1.05.

d. Synthesis of sensitizer No. 9: 2-[3-(1,2,$\beta$,$\alpha$-naphthopyronyl)]-6-methoxybenzopyrylium perchlorate (wherein $R_1$: hydrogen, $R_2$: nitro group, $Z^-$, $ClO_4^-$, $n_1$: 1, $n_2$: 1)

By dissolving 4.8 g of 3-acetyl naphthocoumarin and 3.5 g 2-hydroxy-6-methoxybenzaldehyde in 200 ml of dichloroethane and applying the same procedure as for the synthesis of the sensitizer No. 6, the objective compound in the form of crystals having a melting point of 179° – 181°C was obtained. This compound was orange-colored. Its nitromethane solution showed a maximum absorption wave-length of 542 nm and the extinction coefficient ($\epsilon/10^4$) of its molecule was 1.06. The following are typical examples of the synthesis of the compounds of general formula (III).

a. Synthesis of sensitizer No. 10: 2-[3-(1,2)-benzopyronyl]-$\beta$-naphthopyrylium perchlorate (wherein $R_1$: hydrogen, $R_2$: hydrogen, $Z^-$, $ClO_4^-$, $n_1$ and $n_2$: 1)

After dissolving 2.1 g of 3-acetyl coumarin and 2.1 g of 2-hydroxy-$\beta$-naphthoaldehyde in 200 ml of dichloroethane and adding 12 ml of 70% perchloric acid hydrochloric acid gas was introduced into the mixture to saturate it at a temperature of 0° – 30°C. After leaving the thus reacted solution standing overnight in an icebox and then subjecting it to suction filtration, the resulting crude crystals were thoroughly washed in water and rinsed with ethyl ether. Subsequently, the thus treated crude crystals were recrystallized from 200 – 300 ml of nitrobenzene, whereby 0.2 g of the objective compound in the form of crystal having a melting point of 294° – 296°C were obtained. This compound was orange-colored. Its nitromethane solution showed a maximum absorption wave-length ($\lambda$ max) of 496 nm and the extinction coefficient ($\epsilon/10^4$) of its molecule was 2.94.

b. Synthesis of sensitizer No. 11: 2-[6-methoxy-3-(1,2)-benzopyronyl]-$\beta$-naphthopyrylium perchlorate (wherein $R_1$: methoxy, $R_2$: hydrogen, $Z^-$: $ClO_4^-$, $n_1$ and $n_2$: 1)

By dissolving 2.3 g of 3-acetyl-6-methoxycoumarin and 2.1 g of 2-hydroxy-$\beta$-naphthoaldehyde in 200 ml of dichloroethane and applying the same procedure as for the synthesis of the sensitizer No. 10, 1.3 g of the objective compound in the form of crystals having a melting point of 285° – 287°C were obtained. This compound was brown in color. Its nitromethane solution showed a maximum absorption wavelength ($\lambda$ max) of 512 nm and the extinction coefficient ($\epsilon/10^4$) of its molecule was 2.02.

c. Synthesis of sensitizer No. 12: 2-[6-chloro-3-(1,2)-benzopyronyl]-$\beta$-naphthopyrylium perchlorate (wherein $R_1$: chloro group, $R_2$: hydrogen, $Z^-$: $ClO_4^-$, $n_1$ and $n_2$: 1)

By dissolving 1 g of 3-acetyl-6-chlorocoumarin and 1 g of 2-hydroxy-$\beta$-naphthoaldehyde in 200 ml of dichloroethane and applying the same procedure as for the synthesis of the sensitizer No. 10 thereafter, 1.7 g of the objective compound in the form of crystals having a melting point of 290° – 291°C were obtained. This compound was yellowish brown in color. Its nitromethane solution showed a maximum absorption wavelength ($\lambda$ max) of 493 nm and the extinction coefficient ($\epsilon/10^4$) of its molecule was 2.56.

d. Synthesis of sensitizer No. 13: 2-[3-(1,2)-benzopyronyl]-5,7-dinitro-$\beta$-naphthopyrylium perchlorate (wherein $R_1$: hydrogen, $R_2$: nitro group, $Z^-$: $ClO_4^-$, $n_1$: 1, $n_2$: 2)

By dissolving 0.5 g of 3-acetyl coumarin and 0.5 g of 2-hydroxy-6,8-dinitro-$\beta$-naphthoaldehyde in 200 ml of dichloroethane and applying the same procedure as for the synthesis of the sensitizer No. 10, 0.2 g of the objective compound in the form of crystals having a melting point of 278° – 280°C were obtained. This compound was brown in color. Its nitromethane solution showed a maximum absorption wavelength ($\lambda$ max) of 514 nm and the extinction coefficient ($\epsilon/10^4$) of its molecule was 2.15.

e. Synthesis of sensitizer No. 14: 2-[6-bromo-3-(1,2)-benzopyronyl]-$\beta$-naphthopyrylium perchlorate (wherein $R_1$: bromo group, $R_2$: hydrogen, $Z^-$: $ClO_4^-$, $n_1$ and $n_2$: 1)

By dissolving 2.3 g of 3-acetyl-6-bromocoumarin and 2.1 g of 2-hydroxy-$\beta$-naphthoaldehyde in 200 ml of dichloroethane and applying the same procedure as for the synthesis of the sensitizer No. 10, 1.4 g of the objective compound in the form of crystals having a melting point of 294° – 295°C were obtained. This compound was light brown in color. Its nitromethane solution showed a maximum absorption wave-length ($\lambda$ max) of 493 nm and the extinction coefficient ($\epsilon/10^4$) of its molecule was 2.56. The following are typical examples of the synthesis of the compounds of general formula (IV).

a. Synthesis of sensitizer No. 15: 2-[3-(1,2,$\beta$,$\alpha$-naphthopyronyl)]-$\beta$-naphthopyrylium perchlorate (wherein $R_1$ and $R_2$: hydrogen, $Z^-$: $ClO_4^-$, $n_1$ and $n_2$: 1)

After dissolving 4.2 g of 3-acetyl naphthocoumarin and 3 g of 2-hydroxy-1-naphthoaldehyde in 90 ml of dehydrated ethyl ether and further adding 12 ml of 70% perchloric acid, the resulting solution was saturated with hydrochloric acid gas at a temperature of 0° – 30°C. The thus treated solution was left standing overnight in an icebox and thereafter subjected to suction filtration. The residue was thoroughly washed in water, rinsed with ethyl ether and recrystallized from 200 – 300 ml of nitrobenzene, whereby 5.5 g of the objective compound in the form of crystal having a melting point of 248°C were obtained. This compound was pink in color. Its nitromethane solution showed a maximum absorption wave-length ($\lambda$ max) of 545 nm and the extinction coefficient ($\epsilon/10^4$) of its molecule was 3.49.

b. Synthesis of sensitizer No. 16: 2-[3-{1,2,$\beta$, $\alpha$-(7-nitronaphthopyronyl)}]-7-nitro-$\beta$-naphthopyrylium perchlorate (wherein $R_1$ and $R_2$: nitro group, $Z^-$: $ClO_4^-$, $n_1$ and $n_2$: 1)

After dissolving 0.2 g of 3-acetyl-7-nitronaphthocoumarin and 0.2 g of 2-hydroxy-6-nitro-1-naphthoaldehyde in 45 ml of dehydrated ethyl ether and adding 2 ml of 70% perchloric acid, the resulting solution was saturated with hydrochloric acid gas at a temperature of 0° – 30°C. The thus treated solution was left standing overnight in an icebox and thereafter subjected to suction filtration. The residue was thoroughly washed in water, rinsed with ethyl ether and recrystallized from 100 – 200 ml of nitrobenzene, whereby 0.17 g of the objective compound in the form of crystals having a melting point of 287° – 289°C were obtained. This compound was orange in color. Its nitromethane solution showed a maximum absorption wave-length ($\lambda$ max) of 530 nm and the extinction coefficient ($\epsilon/10^4$) of its molecule was 2.84.

c. Synthesis of sensitizer No. 17: 2-[3-{1,2,$\beta$,$\alpha$-(7-nitronaphthopyronyl)} ]-$\beta$-naphthopyrylium perchlorate (wherein $R_1$: nitro group, $R_2$: hydrogen, $Z^-$: $ClO_4^-$, $n_1$ and $n_2$: 1)

After dissolving 0.5 g of 3-acetyl-7-nitronaphthocoumarin and 0.5 g of 2-hydroxy-1-naphthoaldehyde in 45 ml of dehydrated ethyl ether and adding 2 ml of 70% perchloric acid, the resulting solution was saturated with hydrochloric acid gas at a temperature of 0° – 30°C. The thus treated solution was left standing overnight in an icebox and thereafter subjected to suction filtration. The residue was thoroughly washed in water, rinsed with ethyl ether and recrystallized from 200 – 300 ml of nitrobenzene, whereby 0.4 g of the objective compound in the form of crystals having a melting point of 262° – 264°C were obtained. This compound was orange-colored, and its nitromethane solution showed a maximum absorption wavelength ($\lambda$ max) of 534 nm and the extinction coefficient ($\epsilon/10^4$) of its molecule was 16.0.

d. Synthesis of sensitizer No. 18: 2-[3-{1,2,$\beta$,$\alpha$-(9-chloronaphthopyronyl)} ]-$\beta$-naphthopyrylium perchlorate (wherein $R_1$: chloro group, $R_2$: hydrogen, $Z^-$: $ClO_4^-$, $n_1$ and $n_2$: 1)

After dissolving 0.5 g of 3-acetyl-9-chloronaphthocoumarin and 0.5 g of 2-hydroxy-1-naphthoaldehyde in 45 ml of dehydrated ethyl ether and adding 6 ml of 70% perchloric acid, the resulting solution was saturated with hydrochloric acid gas at a temperature of 0° – 30°C. The thus treated solution was left standing overnight in an icebox and thereafter subjected to suction filtration. The residue was thoroughly washed in water, rinsed with ethyl ether and recrystallized from 200 – 300 ml of nitrobenzene, whereby 0.6 g of the objective compound in the form of crystals having a melting point of 278° – 280°C were obtained. This compound was orange-colored. Its nitromethane solution showed a maximum absorption wavelength ($\lambda$ max) of 554 nm and the extinction coefficient ($\epsilon/10^4$) of its molecule was 5.72.

e. Synthesis of sensitizer No. 19: 2-[3-(1,2,$\beta$,$\alpha$-naphthopyronyl)]9-chloro-62-naphthopyrylium perchlorate (wherein $R_1$: hydrogen, $R_2$: chloro group, $Z^-$: $ClO_4^-$, $n_1$ and $n_2$:1)

After dissolving 0.5 g of 3-acetyl naphthocoumarin and 0.5 g of 2-hydroxy-4-chloro-1-naphthoaldehyde in 90 ml of dehydrated ethyl ether and adding 6 ml of 70% perchloric acid, the resulting solution was saturated with hydrochloric acid gas at a temperature of 0° – 30°C. The thus treated solution was left standing overnight in an icebox and thereafter subjected to suction filtration. The residue was thoroughly washed in water, rinsed with ethyl ether and recrystallized from 200 – 300 ml of nitrobenzene, whereby 0.4 g of the objective compound in the form of crystals having a melting point of 275° – 277°C were obtained. This compound was orange-colored. Its nitromethane solution showed a maximum absorption wavelength ($\lambda$ max) of 548 nm and the extinction coefficient ($\epsilon/10^4$) of its molecule was 2.76.

As will be understood from the foregoing, the sensitizers of the present invention can be obtained by effecting reaction between an acetyl coumarin derivative or acetyl naphthocoumarin derivative having a desired substituent and 2-hydroxybenzaldehyde or 2-hydroxynaphthoaldehyde having a desired substituent in the presence of an acid having a desired anionic functional group.

The functional group corresponding to $Z^-$ in the foregoing general formulas can be converted into another desired functional group by selecting the acid utilized in the above-described condensation ring-closure reaction or by effecting reaction between the aforesaid products and acids having the desired functional groups or salts of such acids.

Suitable examples of such acids or salts thereof include perchloric acid, periodic acid, phosphoric acid, hydrochloric acid, sulfuric acid, sodium borofluoride, sodium iodide, potassium iodide, sodium bromide, potassium iodide, dimethyl phosphate, and diphenyl phosphate.

Typical examples of compounds of formula (I) synthesized through the foregoing procedures are as follows:

2-[6-methoxy-3-(1,2)-benzopyronyl]-benzopyrylium perchlorate, 6-methoxy-2-[6-methoxy-3-(1,2)-benzopyronyl]-benzopyrylium perchlorate, 6-chloro-2-[3-(1,2)-benzopyronyl]-benzopyrylium perchlorate, 2-[6-chloro-3-(1,2)-benzopyronyl]-benzopyrylium perchlorate, 6-chloro-2-[6-methoxy-3-(1,2)-benzopyronyl]-benzopyrylium perchlorate, 6-methoxy-2-[6-chloro-3-(1,2)-benzopyronyl]-benzopyrylium perchlorate, 6-bromo-2-[3-(1,2)-benzopyronyl]-benzopyrylium perchlorate, 2-[6-bromo-3-(1,2)-benzopyronyl]-benzopyrylium perchlorate, 6-bromo-2-[6-methoxy-3-(1,2)-benzopyronyl]-benzopyrylium perchlorate, 6-methoxy-2-[6-bromo-3-(1,2)-benzopyronyl-benzopyrylium perchlorate, 6-bromo-2-[6-chloro-3-(1,2)-benzopyronyl]-benzopyrylium perchlorate, 6-chloro-2-[6-bromo-3-(1,2)-benzopyronyl]-benzopyrylium perchlorate, 6-nitro-2-[6-methoxy-3-(1,2)-benzopyronyl]-benzopyrylium perchlorate, 6,8-dibromo-2[6,8-dibromo-3-(1,2)-benzopyronyl]-benzopyrylium perchlorate, 6,8-dibromo-2-[6-methoxy-3-(1,2)-benzopyronyl]-benzopyrylium perchlorate, 8-methoxy-2-[3-(1,2)-benzopyronyl]-benzopyrylium perchlorate, 8-methoxy-2-[6-methoxy-3-(1,2)-benzopyronyl]-benzopyrylium perchlorate and 8-methoxy-2-[8-methoxy-3-(1,2-benzopyronyl]-benzopyrylium perchlorate.

Typical examples of the compounds of general formula (II) are as follows:

2-[3-{1,2,$\beta$,$\alpha$-(7-nitronaphthophronyl)}]-benzopyrylium perchlorate, 2-[3-(1,2,$\beta$,$\alpha$(1,2,$\beta$,$\alpha$-naphthopyronyl)-6-methylbenzopyrylium perchlorate, 2-[3-{1,2,$\beta$,$\alpha$-(7-chloronaphthopyronyl)}]-6-methylbenzopyrylium perchlorate, 2-[3-(1,2,$\beta$,$\alpha$-naphthopyronyl)]-6-chlorobenzopyrylium perchlorate, 2-[3-(1,2$\beta$,$\alpha$-(8-methoxynaphthopyronyl)]-6,8-dinitrobenzopyrylium perchlorate, 2-[3{1,2,$\beta$,$\alpha$-(7-methylnaphthopyronyl)}]-6-bromobenzopyrylium perchlorate and 2-[3-(1,2,$\beta$,$\alpha$-naphthopyronyl)]-8-methoxybenzopyrylium perchlorate.

Typical examples of the compounds of general formula (III) are as follows:

2-[3(1,2)-benzopyronyl]-7-nitro-$\beta$-naphthopyrylium perchlorate, 2-[6-methoxy-3-(1,2)-benzopyronyl]-7-nitro-$\beta$-naphthopyrylium perchlorate, 2-[3-(1,2)-benzopyronyl]-7-chloro-$\beta$-naphthopyrylium perchlorate, 2-[6-chloro-3-(1,2)-benzopyronyl]-7-chloro-$\beta$-naphthopyrylium perchlorate, 2-[6-methoxy-3-(1,2)-benzopyronyl-9 -5,7-dinitro-$\beta$-naphthopyrylium perchlorate, 2-[6-chloro-3-(1,2)-benzopyronyl]-5,7-dinitro-$\beta$-naphthopyrylium perchlorate, 2-[6-methyl-3-(1,2)-benzopyronyl]-5,7-dinitro-$\beta$-naphthopyrylium perchlorate, 2-[3-(1,2)-benzopyronyl]-7-methoxy-$\beta$-naphthopyrylium perchlorate, 2-[3-(1,2)-benzopyronyl]-7-methyl-$\beta$-naphthopyrylium perchlorate and 2-[6,8-dimethoxy-3-(1,2)-benzopyronyl]-$\beta$-naphthopyrylium perchlorate.

And, typical examples of the compounds of general formula (IV) are as follows:

2-[3-(1,2,$\beta$,$\alpha$-naphthopyronyl)]-naphthopyrylium perchlorate, 2-[3-{1,2,$\beta$,$\alpha$-(7-nitronaphthopyronyl)}] -$\beta$-naphthopyrylium perchlorate, 2-[3-(1,2,$\beta$,$\alpha$-naphthopyronyl)]-7-nitro-$\beta$-naphthopyrylium perchlorate, 2-[3-{1,2,$\beta$,$\alpha$-(7-nitronaphthopyronyl)}]-7-nitro-$\beta$-naphthopyrylium perchlorate, 2-[3-{1,2,$\beta$,$\alpha$-(7-chloronaphthopyronyl)}]-$\beta$-naphthopyrylium perchlorate, 2-[3-(1,2,$\beta$,$\alpha$-naphthopyronyl)]-7-chloro-$\beta$-naphthopyrylium perchlorate, 2-[3-{1,2,$\beta$,$\alpha$-(7-chloronaphthopyronyl)}]-7-chloro-$\beta$-naphthopyrylium perchlorate, 2-[3-{1,2,$\beta$,$\alpha$-(8-methoxy naphthopyronyl)}]-7-methyl-$\beta$-naphthopyrylium perchlorate, 2-[3-{1,2,$\beta$,$\alpha$-(8-methoxy naphthopyronyl)}]-$\beta$-naphthopyrylium perchlorate and 2-[3-(1,2,β,α-naphthopyronyl)]-5,7-dinitro-β-naphthopyrylium perchlorate.

The sensitizers according to the present invention have superior efficiency in chemical and optical sensitization of varieties of the known organic photoconductors and especially displays the advantageous effect of imparting reproducibility to the red-tinted original images in electrophotography. Typical of the organic photoconductors which may be sensitized by mixing or dissolving the sensitizers of this invention therein are:

poly-N-vinyl carbazole, bromo-poly-N-vinyl carbazole, chloro-poly-N-vinyl carbazole, poly-3-vinyl-N-ethyl carbazole, poly-N-(N-acrylamide methyl) carbamoyl methyl carbazole, poly-N-(N-acrylamide methyl) carbamoyl ethyl carbazole, polyphenyl pyrazole, poly-1-allyl-4,5-diphenyl imidazole, polyvinyl pyrene, polyvinyl phenanthrene, polyacenaphthylene, polyvinyl dibenzothiophene, poly-1-vinyl acridine, poly-N-allyl phenothiazine, poly-p-imidazoline-(2)-styrene, polyvinyl anthracene, poly-p-phenylene-1,3,4-oxidiazole, copolymer of anthracene-formalin condensation resin, copolymer of vinyl anthracene and N-vinyl carbazole, copolymer of 1,2-dihydroacenaphthene and indene, pyrene - formaldehyde condensate, etc.

The amount of sensitixer utilized with the foregoing organic photoconductors is from 0.2 – 1.0% by weight. It is desirable to add it to a solution of organic photoconductor upon dissolving it in the least possible quantity of a solvent such as nitromethane.

BRIEF DESCRIPTION OF THE DRAWINGS

In the appended drawings, FIGS. 1 – 19 show the curves indicating respectively the spectral sensitivity of the sensitive paper provided with a sensitive film consisting of an organic photoconductor sensitized with a sensitizer of the present invention.

The following are typical examples of the invention:

DESCRIPTION OF THE PREFERRED EMBODIMENTS

Example 1

Each of the sensitizers No. 1 through No. 5 was dissolved in the minimum quantity of nitromethane and each solution of sensitizer thus obtained was added to 350g of a chlorobenzene solution containing 6.7 weight % of bromo-poly-N-vinyl carbazole in such a manner that the content of the sensitizer was $1.5 \times 10^{-5}$ mol per gr of bromo-poly-N-vinyl carbazole. Each solution prepared as above was applied onto a stencil paper support by means of a coating machine so as to form a film having a dry thickness of 5μ and dried whereby five different electrophotographic sensitive papers were prepared. By carrying the actual image-forming test on each sensitive paper and examining the spectrogram and the surface potential decrement thereof, the sensitization effect was evaluated. First, after imparting a negative electricity to each sensitive paper by means of a corona discharge of about 6 KV, the intensity of illumination on the surface of the sensitive film was set at about 350 luxes with a white light as the light source, a projection exposure of an original image was conducted by the reflective projection method for 0.2 – 0.5 second, and the thus exposed image was developed by the use of a liquid developer for electrophotography prepared by dispersing a toner charged with a positive electricity in isoparaffinic hydrocarbon and dried thereafter, whereby there was obtained an image faithful to the original image.

Next, by imparting a negative electricity to each of the same sensitive papers as above also by means of a corona discharge of about 6 KV, exposing the thus electrified sensitive paper for 10 seconds to light through a 2mm-wide slit by the use of a spectrograph, developing the resulting image with a liquid developer and thereafter drying by gently heating, a spectrogram was obtained respectively. The curves in FIGS. 1 – 5 of the appended drawings show the boundry between the portion having the toner of the developer attached thereto and the portion not having said toner attached thereto in each spectrogram, and the number assigned to the drawing corresponds to the number assigned to the sensitizer applied.

Further, upon electrifying each of the same sensitive papers as above also by means of a corona discharge of about 6 KV and applying white light of 30 luxes thereafter, the surface potential decrement was examined to find out the value of the photosensitivity of each sensitive paper in terms of E ½ and E 1/5 (lux. sec).

In the following Table 1, E ½ and E 1/5 express the applied light volume required for decreasing the surface potential to one half and one fifth respectively, the photographic maximum wave-length expresses the observed value obtained by reading exactly the curves an the reflected spectrum of FIGS. 1 – 5, the color-sensitivity expresses the percentage of the ratio of the reproduced concentration of the red-colored original image to the concentration of image at the time of rendering of the black-colored original image with each sensitive paper.

Table 1

| Sensitive paper | No. of sensitizer applied | Photosensitivity (lux. sec) | | Photographic maximum wave-length (nm) | Color-sensitivity (%) |
|---|---|---|---|---|---|
|  |  | E 1/2 | E 1/5 |  |  |
| I | 1 | 22.9 | 68.0 | 492 | 79.3 |
| II | 2 | 21.1 | 65.1 | 510 | 80.1 |
| III | 3 | 29.1 | 94.9 | 505 | 78.4 |
| IV | 4 | 23.5 | 70.5 | 515 | 78.8 |
| V | 5 | 14.3 | 43.4 | 625 | 79.7 |

It is observed from FIGS. 1 –5 that the sensitizers of the present invention have an excellent effect of sensitizing an organic photoconductor to the extent of from about 400nm to about 700nm, and the showings in the foregoing table verify that the photosensitivity of the thus sensitized organic photoconductor is very satisfactory.

Example 2

A variety of electrophotographic sensitive papers were prepared by combining various organic photoconductors with the sensitizers under the present invention and by applying the same procedure as that for Example 1. When the photosensitivity (E ½) of these sensitive papers were examined, the results were as shown in the following Table 2.

Table 2

| Organic photoconductor (OPC) | Sensitizer | Quantity of sensitizer applied | Photosensitivity (E 1/2) |
|---|---|---|---|
| poly-N-vinyl carbazole | No. 1 | $1.5 \times 10^{-5}$ mol/gr.OPC | 25.1 |
| chloro-poly-N-vinyl carbazole | No. 2 | " | 21.3 |
| poly-N-(N-acrylamide methyl) carbamoyl methyl carbazole | No. 3 | " | 33.7 |
| poly-N-(N-acrylamide methyl) carbamoyl ethyl carbazole | No. 5 | " | 37.0 |

Example 3

By applying the same procedure as that for Example 1 except for employing the sensitizers No. 6 through No. 9 obtained in the foregoing syntheses (a) through (d) of the compounds of general formula (II), four different electrophotographic sensitive papers were prepared.

By carrying the actual image printing test on each sensitive paper by the same method of test as in Example 1 and examining the spectrogram and the surface potential decrement thereof, the sensitization effect was evaluated. The result of the evaluation was almost the same as that in Example 1. In this connection, the curves in FIGS. 6 – 9 of the appended drawings show the boundary between the portion having the toner of the developer attached thereto and the portion not having said toner attached thereto in each spectrogram, and the number assigned to the drawing corresponds to the number assigned to the sensitizer applied.

Further, the photosensitivity in terms of E ½ and E 1/5 (lux·sec) of each sensitive paper prepared in the present example was measured in the same way as in Example 1. The results were as shown in the following Table 3.

Table 3

| Sensitive paper | No. of sensitizer applied | Photosensitivity (lux·sec) E 1/2 | Photosensitivity (lux·sec) E 1/5 | Photographic maximum wavelength (nm) | Color sensitivity (%) |
|---|---|---|---|---|---|
| VI | 6 | 20.5 | 65.3 | 515 | 80.5 |
| VII | 7 | 19.1 | 60.5 | 535 | 79.7 |
| VIII | 8 | 18.9 | 57.1 | 605 | 76.5 |
| IX | 9 | 19.4 | 59.4 | 560 | 81.2 |

It is observed from FIGS. 6 – 9 that the sensitizers of this invention have an excellent effect of sensitizing an organic photoconductor to the extent of from about 400nm to about 700nm, and the showings in the foregoing Table 3 verify that the photosensitivity of the thus sensitized organic photoconductor is very satisfactory.

Example 4

By combining those sensitizers employed for Example 3 with various organic photoconductors and applying the same procedure as that for Example 2, three different electrophotographic sensitive papers were prepared. When the photosensitivity (E ½) of each sensitive paper was measured, the results were as shown in the following Table 4.

Table 4

| Organic photoconductor (OPC) | Sensitizer | Quantity of sensitizer applied | Photosensitivity (E 1/2) |
|---|---|---|---|
| poly-N-vinyl carbazole | No. 6 | $1.5 \times 10^{-5}$ mol/gr.OPC | 20.8 |
| chloro-poly-N-vinyl carbazole | No. 8 | " | 20.1 |
| poly-N-(N-acrylamide methyl) carbamoyl carbazole | No. 9 | " | 30.5 |

Example 5

By applying the same procedure as that for Example 1 except for employing the sensitizers No. 10 through No. 14 obtained in the foregoing syntheses (a) through (e) of the compounds of the general formula (III), five different electrophotographic sensitive papers were prepared.

By carrying the actual image printing test on each sensitive paper by the same method of test as in Example 1 and examining the spectrogram and the surface potential decrement thereof, the sensitization effect was evaluated. The result of the evaluation was almost the same as that in Example 1. In this connection, the curves in FIGS. 10 – 14 of the appended drawings show the boundary between the portion having the toner of the developer attached thereto and the portion not having said toner attached thereto in each spectrogram, and the number assigned to the drawing corresponds to the number assigned to the sensitizer applied.

Further, the photosensitivity in terms of E ½ and E 1/5 (lux·sec) of each sensitive paper prepared in the present example was measured in the same way as in Example 1. The result was as shown in the following Table 5.

Table 5

| Sensitive paper | No. of sensitizer applied | Photosensitivity (lux·sec) E 1/2 | Photosensitivity (lux·sec) E 1/5 | Photographic maximum wavelength (nm) | Color sensitivity (%) |
|---|---|---|---|---|---|
| X | 10 | 14.9 | 46.9 | 520 | 79.3 |
| XI | 11 | 16.0 | 46.9 | 533 | 78.6 |
| XII | 12 | 18.9 | 57.1 | 504 | 81.2 |
| XIII | 13 | 18.2 | 55.0 | 528 | 79.8 |
| XIV | 14 | 17.1 | 53.1 | 506 | 80.5 |

It is observed from FIGS. 10 – 14 that the sensitizers of this invention have an excellent effect of sensitizing an organic photoconductor to the extent of from about 400nm to about 700nm, and the showings of the foregoing Table 5 verify that the photosensitivity of the thus sensitized organic photoconductor is very satisfactory.

Example 6

By combining those sensitizers employed for Example 5 with various organic photoconductors and applying the same procedure as that for Example 2, four different electrophotographic sensitive papers were prepared. When the photosensitivity (E ½) of each sensitive paper was measured, the results were as shown in the following Table 6.

Table 6

| Organic photoconductor (OPC) | Sensitizer | Quantity of sensitizer applied | Photosensitivity (E 1/2) |
| --- | --- | --- | --- |
| poly-N-vinyl carbazole | No. 10 | $1.5\times10^{-5}$ mol/gr.OPC | 16.2 |
| chloro-poly-N-vinyl carbazole | No. 11 | " | 16.7 |
| poly-N-(N-acrylamide methyl) carbamoyl methyl carbazole | No. 12 | " | 31.5 |
| poly-N-(N-acrylamide methyl) carbamoyl ethyl carbazole | No. 14 | " | 33.0 |

Example 7

By applying the same procedure as that for Example 1 except for employing the sensitizers No. 15 through No. 19 obtained in the foregoing syntheses (a) through (e) of the compounds to be expressed by the general formula (IV), five different electrophotographic sensitive papers were prepared.

By carrying the image printing test on each sensitive paper by the same method of test as in Example 1 and examining the spectrogram and the surface potential decrement thereof, the sensitization effect was evaluated. The result of the evaluation was almost the same as that in Example 1. In this connection, the curves in FIGS. 15 – 19 of the appended drawings show the boundary between the portion having the toner of the developer attached thereto and the portion not having said toner attached thereto in each spectrogram, and the number assigned to the drawing corresponds to the number assigned to the sensitizer applied.

Further, the photosensitivity in terms of E 1/2 and E 1/5 (lux·sec) was measured in the same way as in Example 1. The results were as shown in the following Table 7.

Table 7

| Sensitive paper | No. of sensitizer applied | Photosensitivity (lux·sec) E 1/2 | Photosensitivity (lux·sec) E 1/5 | Photographic maximum wavelength (nm) | Color-sensitivity (%) |
| --- | --- | --- | --- | --- | --- |
| XV | 15 | 15.4 | 44.6 | 570 | 79.5 |
| XVI | 16 | 23.1 | 57.4 | 549 | 80.1 |
| XVII | 17 | 21.5 | 53.8 | 540 | 77.9 |
| VIII | 18 | 26.3 | 60.1 | 562 | 78.3 |
| XIX | 19 | 25.7 | 58.4 | 553 | 80.5 |

It is observed from FIGS. 15 – 19 that the sensitizers of this invention have an excellent effect of sensitizing an organic photoconductor to the extent of from about 400nm to about 700nm, and the showings of the foregoing Table 7 verify that the photosensitivity of the thus sensitized photoconductor is very satisfactory.

Example 8

By combining these sensitizers employed for Example 7 with various organic photoconductors and applying the same procedure as that for Example 2, four kinds of electrophotographic sensitive papers were prepared. When the photosensitivity (E 1/2) of each sensitive paper was measured, the result was as shown in the following Table 8.

Table 8

| Organic photoconductor (OPC) | Sensitizer | Quantity of sensitizer applied | Photosensitivity (E 1/2) |
| --- | --- | --- | --- |
| poly-N-vinyl carbazole | No. 15 | $1.5\times10^{-5}$ mol/gr.OPC | 18.5 |
| chloro-poly-N-vinyl carbazole | No. 16 | " | 26.7 |
| poly-N-(N-acrylamide methyl) carbamoyl methyl carbazole | No. 17 | " | 32.5 |
| poly-N-(N-acrylamide methyl) carbamoyl ethyl carbazole | No. 19 | " | 38.4 |

What is claimed is:

1. A sensitized photoconductive composition comprising a polymeric organic photoconductor together with from 0.2 to 1.0% by weight based on the weight of the photoconductor of a sensitizer having the formula:

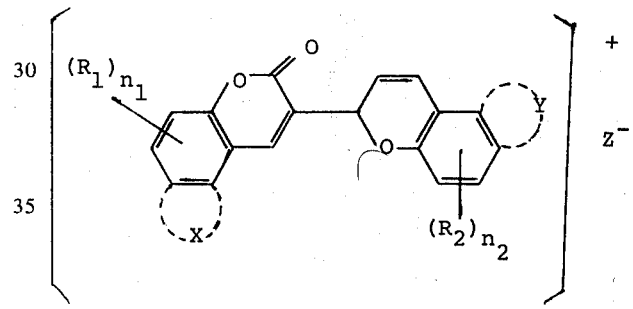

wherein each of $R_1$ and $R_2$ represents a radical selected from the group consisting of hydrogen, alkyl having 1 – 2 carbon atoms, alkoxy having 1 – 2 carbon atoms, halogen and nitro, each of $n_1$ and $n_2$ represents an integer from 1 to 2 in the case where said $R_1$ and $R_2$ represent a radical other than hydrogen, each of X and Y, when present represent a fused phenyl nucleus having at most two substituents selected from the group defined for said $R_1$ and $R_2$, and $Z^-$ represents anionic functional group.

2. A sensitized photoconductive composition according to claim 1 comprising a polymeric organic photoconductor together with from 0.2 to 1.0% by weight based on the weight of the photoconductor of a sensitizer selected from the group consisting of 2-[6-methoxy-3-(1,2)-benzopyronyl]-benzopyrylium perchlorate, 6-methoxy-2-[6-methoxy-3-(1,2)-benzopyronyl]-benzopyrylium perchlorate, 6-chloro-2-[3-(1,2)-benzopyronyl]-benzopyrylium perchlorate, 2-[6-chloro-3-(1,2)-benzopyronyl]-benzopyrylium perchlorate, 6-chloro-2-[6-methoxy-3-(1,2)-benzopyronyl]-benzopyrylium perchlorate, 6-methoxy-2-[6-chloro-3-(1,2)-benzopyronyl]-benzopyrylium perchlorate, 6-bromo-2-[3-(1,2)-benzopyronyl]-benzopyrylium perchlorate, 2-[6-bromo-3-(1,2)-benzopyronyl]-benzopyrylium perchlorate, 6-bromo-2-[6-methoxy-3-(1,2)-benzopyronyl]-benzopyrylium perchlorate, 6-methoxy-2-[6-bromo-3-(1,2)-benzopyronyl]- benzopyrylium perchlorate, 6-bromo-2-[6-chloro-3-(1,2)-benzopyronyl]-benzopyrylium perchlorate, 6-chloro-2-[6-bromo-3-(1,2)-benzopyronyl] -benzopyrylium perchlorate, 6-nitro-2-[6-methoxy-3-(1,2)-benzopyronyl]-benzopyrylium perchlorate, 6,8-dibromo-2-[6,8-dibromo-3-(1,2)-benzopyronyl]-benzopyrylium perchlorate, 6,8-dibromo-2-[6-methoxy-3-(1,2)-benzopyronyl]-benzopyrylium perchlorate, 8-methoxy-2-[3-(1,2)-benzopyronyl]-benzopyrylium perchlorate, 8-methoxy-2-[6-methoxy-3-(1,2)-benzopyronyl]-benzopyrylium perchlorate, 8-methoxy-2-[8-methoxy-3-(1,2)-benzopyronyl]-benzopyrylium perchlorate, 2-[3- {1,2,β, α-(7-nitronaphthopyronyl) } ]-benzopyrylium perchlorate, 2-[3-(1,2,β, α-naphthopyronyl)]-6-methylbenzopyrylium perchlorate, 2-[3-{1,2,β,α-(7-chloronaphthopyranyl)} ]-6-methylbenzopyrylium perchlorate, 2-[3-(1,2,β,α-naphthopyronyl)]-6-chlorobenzopyrylium perchlorate, 2-[3-{1,2,β,α-(8-methoxy-naphthopyronyl)} ]-6,8-dinitrobenzopyrylium perchlorate, 2-[3-{1,2,β,α-(7-methylnaphthopyronyl)}]-6-bromobenzopyrylium perchlorate, 2-[3-(1,2,β, α-naphthopyronyl)]-8-methoxybenzopyrylium perchlorate, 2 -[3-(1,2)-benzopyronyl]-7-nitro-β-naphthopyrylium perchlorate, 2-[6-methoxy-3-(1,2)-benzopyronyl]-7-nitro-β-naphthopyrylium perchlorate, 2-[3-(1,2(-benzopyronyl]-7-chloro-β-naphthopyrylium perchlorate, 2-[6-chloro-3-(1,2)-benzopyronyl]-7-chloro-β-naphthopyrylium perchlorate, 2-[6-methoxy-3-(1,2)-benzopyronyl]-5,7-dinitro-β-naphthopyrylium perchlorate, 2-[6-chloro-3-(1,2)-benzopyronyl]-5,7-dinitro-β-naphthopyrylium perchlorate, 2-[3-(1,2)-benzopyronyl]-7-methoxy-β-naphthopyrylium perchlorate, 2-[3-(1,2)-benzopyronyl]-7-methyl-β-naphthopyrylium perchlorate, 2-[6,8-dimethoxy-3-(1,2)-benzopyronyl]-β-naphthopyrylium perchlorate, 2-[3-(1,2,β,α-naphthopyronyl)]-β-naphthopyrylium perchlorate, 2-[3-{1,2,β,α-(7-nitronaphthopyronyl)}]-β-naphthopyrylium perchlorate, 2-[3-(1,2,β,α-naphthopyronyl)]-7-nitro -β-naphthopyrylium perchlorate, 2-[3-{1,2,β,α-(7-nitronaphthopyronyl)}]-7-nitro-β-naphthopyrylium perchlorate, 2-[3-{1,2,β,α-(7-chloronaphthopyronyl) } ]-β-naphthopyrylium perchlorate, 2-[3-(1,2,β,α-naphthopyronyl)]-7-chloro-β-naphthopyrylium perchlorate, 2-[3-{1,2,β,α-(7-chloronaphthopyronyl)} ]-7-chloro-β-naphthopyrylium perchlorate, 2-[3-{1,2,β,α-(8-methoxy naphthopyronyl)} ]-7-methyl-β-naphthopyrylium perchlorate, 2-[3-{1,2,β,α-(8-methoxy naphthopyronyl)}]-β-naphthopyrylium perchlorate and 2-[3-(1,2,β,α-naphthopyronyl)]-5,7-dinitro-β-naphthopyrylium perchlorate.

3. A sensitized photoconductive composition according to claim 1 comprising a polymeric organic photoconductor together with from 0.2 to 1.0% by weight based on the weight of the photoconductor of a sensitizer having the general formula:

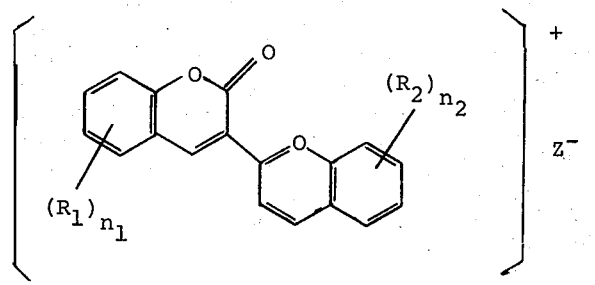

wherein each of $R_1$ and $R_2$ represents hydrogen, an alkyl group having 1 or 2 carbon atoms, an alkoxy group having 1 or 2 carbon atoms, halogen or nitro group; each of $n_1$ and $n_2$ represents an integer from 1 to 2 in the case where said $R_1$ and $R_2$ represent a radical other than hydrogen.

4. A composition as in claim 1 wherein the sensitizer is 2-[3-(1,2)-benzopyronyl]-benzopyrylium perchlorate.

5. A composition as in claim 1 wherein the sensitizer is 6-methoxy-2-[6-methoxy-3-(1,2)-benzopyronyl]-benzopyrylium perchlorate.

6. A composition as in claim 1 wherein the sensitizer is 6-chloro-2-[6-chloro-3-(1,2)-benzopyronyl]-benzopyrylium perchlorate.

7. A composition as in claim 1 wherein the sensitizer is 6-nitro-2-[6-nitro-3-(1,2)-benzopyronyl]-benzopyrylium perchlorate.

8. A composition as in claim 1 wherein the sensitizer is 6-bromo-2-[6-bromo-3-(1,2)-benzopyronyl]-benzopyrylium perchlorate.

9. A sensitized photoconductive composition according to claim 1 comprising a polymeric organic photoconductor together with from 0.2 to 1.0% by weight based on the weight of the photoconductor of a sensitizer having the general formula:

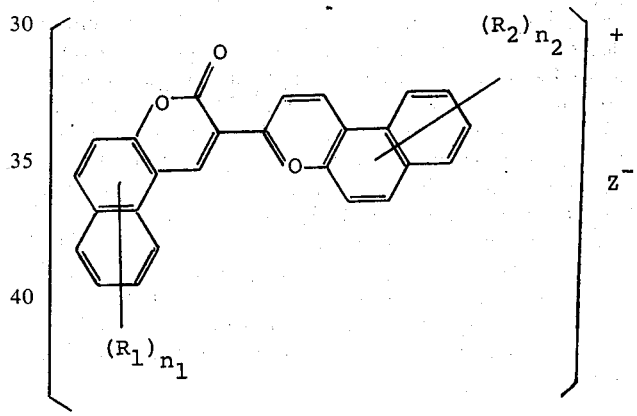

wherein $R_1$, $R_2$, $Z^-$, $n_1$ and $n_2$ are respectively the same as defined in the general formula (I).

10. A composition as in claim 9 wherein the sensitizer is 2-[3-(1,2,β,α-naphthopyronyl)]-benzopyrylium perchlorate.

11. A composition as in claim 9 wherein the sensitizer is { 2-[3- 1,2,β,α-(7-nitronaphthopyronyl)} ]-6-methoxybenzopyrylium perchlorate.

12. A composition as in claim 9 wherein the sensitizer is 2-[3-{1,2,β,α-(7-chloro-naphthopyronyl)}]-6-chlorobenzopyrylium perchlorate.

13. A composition as in claim 9 wherein the sensitizer is 2-[3-(1,2,β,α-naphthopyronyl)]-6-methoxybenzopyrylium perchlorate.

14. A composition as in claim 9 wherein the sensitizer is 2-[3-{1,2,β,α-(7-chlornaphthopyronyl)}]-6-methylbenzopyrylium perchlorate.

15. A sensitized photoconductive composition according to claim 1 comprising a polymeric organic photoconductor together with from 0.2 to 1.0% by weight based on the weight of the photoconductor of a sensitizer having the general formula

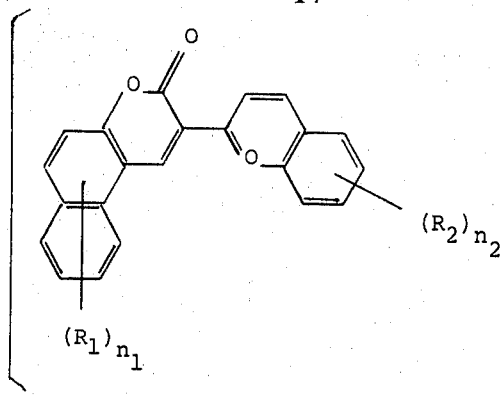

wherein $R_1$, $R_2$, $Z^-$, $n_1$ and $n_2$ are respectively the same as defined in the general formula (I).

16. A composition as in claim 15 wherein the sensitizer is 2-[3-(1,2)-benzopyronyl]-β-naphthopyrylium perchlorate.

17. A composition as in claim 15 wherein the sensitizer is 2-[6-methoxy-3-(1,2)-benzopyronyl]-β-naphthopyrylium perchlorate.

18. A composition as in claim 15 wherein the sensitizer is 2-[6-chloro-3-(1,2)-benzopyronyl]-β-naphthopyrylium perchlorate.

19. A composition as in claim 15 wherein the sensitizer is 2-[3-(1,2)-benzopyronyl]-5,7-dinitro-β-naphthopyrylium perchlorate.

20. A composition as in claim 15 wherein the sensitizer is 2-[6-bromo-3-(1,2)-benzopyronyl]-β-naphthopyrylium perchlorate.

21. A sensitized photoconducting composition according to claim 1 comprising a polymeric organic photoconductor together with from 0.2 to 1.0% by weight based on the weight of the photoconductor of a sensitizer having the general formula:

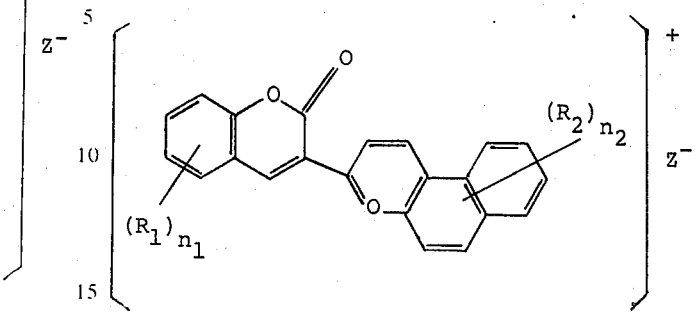

wherein $R_1$, $R_2$, $Z^-$, $n_1$ and $n_2$ are respectively the same as defined in the general formula (I).

22. A composition as in claim 21 wherein the sensitizer is 2-[3-(1,2,β,α-naphthopyronyl)]-β-naphthopyrylium perchlorate.

23. A composition as in claim 21 wherein the sensitizer is 2-[3-{1,2,β,α-(7-nitronaphthopyronyl)}]-7-nitro-β-naphthopyrylium perchlorate.

24. A composition as in claim 21 wherein the sensitizer is 2-[3-{1,2,β,α-nitronaphthopyronyl)}]-β-naphthopyrylium perchlorate.

25. A composition as in claim 21 wherein the sensitizer is 2-[3-{1,2,β,α-9-chloronaphthopyronyl)}]-β-naphthopyrylium perchlorate.

26. A composition as in claim 21 wherein the sensitizer is 2-[3-(1,2,β,α-naphthopyronyl)]-9-chloro-β-naphthopyrylium perchlorate.

* * * * *